(12) United States Patent
Nazal et al.

(10) Patent No.: US 11,504,694 B2
(45) Date of Patent: Nov. 22, 2022

(54) REUSABLE BIOMASS-DERIVED BIOCHAR ADSORBENT FOR PHENOLIC COMPOUND REMOVAL

(71) Applicant: KING FAHD UNIVERSITY OF PETROLEUM AND MINERALS, Dhahran (SA)

(72) Inventors: Mazen Khaled Nazal, Dhahran (SA); Nabeel Saeed Abuzaid, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 290 days.

(21) Appl. No.: 16/750,201

(22) Filed: Jan. 23, 2020

(65) Prior Publication Data
US 2021/0229069 A1     Jul. 29, 2021

(51) Int. Cl.
| | | |
|---|---|---|
| *C02F 1/28* | (2006.01) | |
| *B01J 20/20* | (2006.01) | |
| *B01J 20/28* | (2006.01) | |
| *B01J 20/30* | (2006.01) | |
| *C02F 101/36* | (2006.01) | |

(52) U.S. Cl.
CPC .......... *B01J 20/20* (2013.01); *B01J 20/2808* (2013.01); *B01J 20/28059* (2013.01); *B01J 20/28071* (2013.01); *B01J 20/28083* (2013.01); *B01J 20/3078* (2013.01); *C02F 1/283* (2013.01); *B01J 2220/4843* (2013.01); *C02F 2101/363* (2013.01)

(58) Field of Classification Search
CPC ..................................................... C02F 1/283
See application file for complete search history.

(56) References Cited

FOREIGN PATENT DOCUMENTS

| CN | 105561922 A | 5/2016 |
| CN | 106693919 A | 5/2017 |
| CN | 109234353 A | 1/2019 |
| CN | 109384351 A | 2/2019 |
| KR | 10-1725459 B1 | 4/2017 |

OTHER PUBLICATIONS

Mahajan, 'Surface-Treated Activated Carbon for Removal of Phenol from Water' in Separation Science and Technology vol. 15 #10 pp. 1733-1752 (1980). (Year: 1980).*
Abel E. Navarro, et al., "Bioremoval of Phenol from Aqueous Solutions Using Native Caribbean Seaweed", Environments, vol. 4, No. 1, 2017, pp. 1-14.
Takashi Hirooka, et al., "Removal of hazardous phenols by microalgae under photoautotrophic conditions", Journal of Bioscience and Bioengineering, vol. 95, Issue 2, 2003, pp. 200-203 (Abstract only).
Eugenia Rubin, et al., "Biosorption of phenolic compounds by the brown alga *Sargassum muticum*", Journal of Chemical Technology and Biotechnology, vol. 81, Issue 7, Jan. 10, 2006, pp. 1-24.
Abel E. Navarro, et al., "Adsorptive Removal of 2-Nitrophenol and 2-Chlorophenol by Cross-Linked Algae from Aqueous Solutions", Separation Science and Technology, vol. 43, Issue 11-12, 2008, pp. 3183-3199 (Abstract only).
V. Klekner, et al., "Degradation of phenols by algae", Environmental Technology, vol. 13, Issue 5, 1992, pp. 493-501 (Abstract only).
Aikaterini Papazi, et al., "Comparative biodegradation of all chlorinated phenols by the microalga *Scenedesmus obliquus*—The biodegradation strategy of microalgae", Journal of Biotechnology, vol. 296, Apr. 20, 2019, pp. 61-68 (Abstract only).

\* cited by examiner

*Primary Examiner* — Stuart L Hendrickson
(74) *Attorney, Agent, or Firm* — Oblon, McClelland, Maier & Neustadt, L.L.P.

(57) ABSTRACT

A biochar-derived adsorbent preferably from *Sargassum boveanum*, macroalgae can be used for removing phenolic compounds, such as 2,4,6-trichlorophenol and 2,4-dimethylphenol, from aqueous solutions. The carbonization can improve the removal capability of the macroalgae adsorbent for such phenolic compounds with removal efficiencies of 60% or more from high salinity seawater and 100% from distilled water. The adsorption may occur through a mixed mechanism dominated by physisorption following pseudo second-order kinetics. The adsorption of the phenolic molecules may be spontaneous, endothermic and thermodynamically favorable.

15 Claims, 2 Drawing Sheets

REUSABLE BIOMASS-DERIVED BIOCHAR ADSORBENT FOR PHENOLIC COMPOUND REMOVAL

BACKGROUND OF THE INVENTION

Field of the Invention

The present disclosure relates to the adsorption of contaminants, particularly including organic phenolic compounds, from solutions, such as aqueous solutions, including waste fluids, i.e., liquids and gases, such as waste waters and exhausts.

Description of the Related Art

In the past few years, there has been growing concern among scientists and policymakers with respect to the occurrence and effects of commonly used preservatives on human and animal health in the aquatic environment. Special attention has been directed to substances which interfere with the endocrine system of living organisms called endocrine disrupting compounds (EDCs). Phenolic compounds are among the EDCs which have a long residence time in the environment and toxic effects on living organisms.

The effluents of various industries like petrochemicals, oil refining, plastics, paint, cooking operations, resin manufacturing, paper, pulp, and wood products are the major sources of such phenolic compounds. Due to their persistence, bioaccumulation, and toxicity, such phenolic compounds have been listed as pollutants of priority concern by the US Environmental Protection Agency (USEPA) and the National Pollutant Release Inventory (NPRI). Discharging these phenolic compounds without treatment not only contaminates wastewaters and groundwater but aqueous environments generally which leads to serious health risks to animals, aquatic systems, as well as humans.

Therefore, there is a need to treat wastewater, particularly contaminated with chlorophenols, before discharging such wastewater into the aquatic environment. Many studies have been carried out in the past few years for the removal of these compounds from wastewater using at least one of a variety of methods including biodegradation, adsorption, membrane separation, ion exchange, solvent extraction, ozonation, electrochemical oxidation, etc. Among these methods, the adsorption process is one of the most common methods applied widely for removal of contaminants from water, which is simple, efficient, and capable for removing most forms of organic material. Adsorption using activated carbon and biochar can be an effective, relatively low-cost method for removal of chlorophenols from aqueous media.

The success of certain activated carbons and biochars in adsorption applications has motivated researchers' interest in developing further adsorbents from different sources which are cheaper, renewable, and more abundantly available than commercially available materials. Materials including pomegranate peel ash, palm seed coat, dried activated sludge, fly ash, red mud, bituminous coal, and olive mill waste have been reported for the removal of chlorophenols.

Algae-based bioadsorbents are ecofriendly, inexpensive, and readily available. Seaweed macroalgae are a potential source of bioadsorbent and are classified into three main groups: (i) Chlorophyta (green algae); (ii) Rhodophyta (red algae); and (iii) Phaeophyta (brown algae). The Sargassum Boveanum brown algae have been candidates as bioadsorbents due to their cell wall structure and components, including cellulose, alginate, and other polysaccharides. These compounds, i.e., cellulose, alginate, and polysaccharides, have many active chemical functional groups such as carboxylic acid, hydroxyl, and amine groups that can provide high affinity and selectivity towards phenolic compounds. The bioadsorption of phenolic compounds using brown macroalgae, reported herein, may be achieved through a hydrophobic and donor-acceptor interactions.

No information has been available to date concerning the adsorption of 2,4,6-trichlorophenol (TCP) or 2,4-dimethyphenol (DMP) compounds onto a biochar adsorbent derived from *Sargassum Boveanum* marine macroalgae. Certain research in the field warrants comment.

CN 109234353 A by Duan et al. (Duan) discloses a method of degrading nonylphenol by microalgae involving: (1) cultivating four kinds of sterile microalgae; (2) extracting and measuring chlorophyll a; (3) setting up four nonylphenol group experiments; (4) correlating microalgae absorbance with cell density and biomass in the nonylphenol degradation by the microalgae; and (5) removing nonylphenol by the extracellular and intracellular absorption of nonylphenol by the microalgae. Duan's four marine microalgae, *Phaeocystis globosa, Pseudochlorococcus* sp., *Dunaliella salina,* and *Platymonas subcordiformis,* are reported to absorb, adsorb, and degrade nonylphenol. The removal rates of nonylphenol, including adsorption rate, absorption rate, and degradation rate, ranged from 47.18% to 59.05%. Duan does not disclose using a char-based adsorbent beyond describing activated carbon in its background section, nor does Duan describe a char produced from *Sargassum boveanum* macroalgae.

CN 109384351 A by Cui et al. (Cui) discloses an algae-membrane reactor for treating phenolic wastewater, the reactor being mainly composed of a raw water tank, an aeration device, a cylindrical reactor, an algae body concentration on-line detection system, a pump, a clear liquid storage tank, and the like. A plant growth lamp provides illumination for the growth of microalgae. Cui mixes microalgae and the phenolic wastewater under an oxygen supply, and degrades the phenolic compounds by controlling the microalgae concentration. Cui does not disclose a char-based adsorbent, nor a char produced from its microalgae or a macroalgae, let alone from *Sargassum boveanum* macroalgae.

CN 105561922 A by Lei et al. (Lei) discloses a preparation of an alga biological adsorbent involving: (1) physically drying and pulverizing algae; (2) chemically treating to remove impurities adsorbed onto the algae; (3) deactivating the algae under high temperature and strong acid conditions; (4) mixing with modified activated sludge; and (5) carbonization coating to obtain the biological adsorbent, which can be used for treating heavy metal wastewater, on the surfaces of particles. Lei's dead algae have broken cell walls having exposed internal functional groups that can be combined with metal ions. Lei's crushed, powdered, dead algae-based adsorbent is recyclable, but made from *G. scendesmus* (a green algae) and horsetail algae seaweed, but is not a char-based adsorbent nor a char produced from *Sargassum boveanum* macroalgae. Instead, Lei's macroalgae are combined with pre-treated sludge and heated in a carbonization oven at 700 to 800° C. for 20 to 30 minutes. Lei's macroalgae are used for the removal of heavy metal ions from water.

KR 10-1725459 B1 to Woo et al. (Woo) discloses a biochar, and its production, for removing marine seaweed/algae-derived organosulfur compounds by adsorption. Woo's biochar adsorbs tert-butyl mercaptan, tetrahydrothiophene, and dimethyl sulfide in methane fuel streams under an ambient temperature and atmospheric pressure. Woo describes heating a vast number of seaweeds, including Sargassum brown algae, at 350 to 550° C. in an oxygen-free environment, then treating with a strong base, acid, or metal ions, to obtain a heat treated material which is used to purify methane gas, not liquids or waste fluids, of organic sulfur compounds.

CN 106693919 A by Yu et al. (Yu) discloses the preparation of a heavy metal ion adsorbent involving: (1) air drying, cleaning, and crushing raw marine aquatic plant copper algae (*Sargassum horneri*); (2) steam pressurizing the *Sargassum horneri* particles to an assigned pressure, e.g., 3.5 MPa, maintaining for a certain time, and relieving the pressure to a normal pressure; and (3) heating at reflux in a formaldehyde-sulfuric acid mixture, filtering, flushing filter residues with deionized water, and drying to constant weight, so as to obtain the adsorbent. Yu describes using the adsorbent in sewage treatment and chromium ion removal. Yu does not char its adsorbent, i.e., does not heat above 80° C., nor describe a char from *Sargassum boveanum* macroalgae or adsorbing phenolic compounds.

*Environments* 2017, 4, 1-14 by Navarro et al. (Navarro I) discloses Puerto Rican algae, *Sargassum* sp. and *Chaetomorpha* with phenol adsorption capacity from aqueous solutions at room temperature. Navarro reports pH to exhibit a strong effect and heavy metals like Cu, Pb, and Co to negatively affect adsorption. Navarro's algae are sun-dried and crushed with a mortar and pestle, not charred.

*J. Biosci. Bioeng.* 2003, 95(2), 200-203 by Hirooka et al. (Hirooka) discloses screening various algae for their ability to decrease the concentration of 2,4-dinitrophenol, as a model compound of hazardous phenols, under photoautotrophic conditions. Hirooka discloses that microalgae would be applicable to the removal of hazardous phenols without the addition of any organic carbon sources, but does not describe a char-based adsorbent nor a char from *Sargassum boveanum* macroalgae.

*J. Chem. Techn. Biotechn.* 2006, 81(7), 1093-1099 by Rubin et al. (Rubin) discloses the biosorption of phenol, 2-chlorophenol, and 4-chlorophenol on *Sargassum muticum*. Rubin pre-treats its dried algae with $CaCl_2$, but does not heat its algal biomass above 60° C. Rubin does not disclose a char-based adsorbent.

*Separ. Sci. Techn.* 2008, 43(11-12), 3183-3199 by Navarro et al. (Navarro II) discloses removal of 2-nitrophenol and 2-chlorophenol with cross-linked marine seaweeds, *Lessonia nigrescens* and *Macrocystis integrifolia*, from aqueous solutions at room temperature was investigated. Navarro II's cross-linked algae is not on a char-based adsorbent.

*Environ. Techn.* 1992, 13(5), 493-501 by Klekner et al. (Klekner) discloses strains of *Chlorella* sp., *Scenedesmus obliquus,* and *Spirulina maxima* for degrading some phenolic compounds listed by the US EPA as priority pollutants, finding that these algae have a mechanism for degradation of phenolic compounds. Klekner does not describe a char.

*J. Biotechn.* 2019, 296, 61-68 by Papazi et al. (Papazi) discloses the comparative biodegradation of chlorinated phenolic compounds by the green alga, *Scenedesmus obliquus,* and microalgal bioenergetic strategy. Papazi uses algal biomass and does not describe a char-based adsorbent.

In light of the above, a need remains for adsorption agents for phenolic compounds, particularly for adsorbents based on abundantly available, regenerative biospheric materials, such as macroalgae/seaweed-based materials including chars of these, and methods of making and using such materials.

SUMMARY OF THE INVENTION

Aspects of the invention provide methods for removing a phenolic compound from a fluid, which methods may comprise: contacting the fluid, comprising the phenolic compound, with an adsorbent comprising at least 90 wt. %, based on total adsorbent weight, of a macroalgae char, wherein the char has a BET surface area in a range of from 3 to 5 $m^2/g$. Such methods may be modified by any permutation of the features described herein, particularly the following.

The fluid may comprise a liquid and/or a gas. The fluid may comprise at least 50 wt. %, relative to total fluid weight, of water. The fluid may be a waste water.

The char may be prepared from *Sargassum boveanum* macroalgae. The char may be produced by a process comprising heating *Sargassum boveanum* macroalgae at a temperature in a range of from 375 to 600° C. under an inert atmosphere.

The phenolic compound may comprise a chlorophenol. The phenolic compound may comprise 2,4,6-trichlorophenol and/or 2,4-dimethylphenol.

Aspects of the invention provide adsorbents comprising a macroalgae char in an amount of at least 97.5 wt. %, relative to total adsorbent weight, wherein the char has a BET surface area in a range of from 3 to 5.5 $m^2/g$, a pore volume in a range of from 0.0025 to 0.01 mL/g, and/or an average pore size in a range of from 5 to 15 Å. Such adsorbents may be modified by any permutation of the features described herein.

The adsorbent may be suitable for reuse at least 3 times maintaining at least 95% of its original adsorption efficiency for one or more chlorophenolic compounds. The adsorbent may be suitable for reuse at least 4 times maintaining at least 70% of its original adsorption efficiency for one or more chlorophenolic compounds.

Aspects of the invention provide adsorbents consisting essentially of a macroalgae char having: a BET surface area in a range of from 2 to 7.5 $m^2/g$; a pore volume in a range of from 0.002 to 0.02 mL/g; and/or an average pore size in a range of from 2.5 to 25 Å.

Aspects of the invention provide waste water treatment systems comprising any permutation of the inventive adsorbents described herein, wherein adsorbent is suitable to adsorbing at least 50 wt. % of at least one chlorophenolic compound present in the waste water at a concentration up to 500 ppm per gram of adsorbent. Aspects of the invention provide chlorophenolic compound removal systems comprising any permutation of the inventive adsorbents described herein. Such methods may be modified by any permutation of the features described herein.

Aspects of the invention provide methods of making any permutation of the inventive adsorbents described herein, which methods may comprise: freeing a mass of macroalgae of at least 97.5 wt. % of non-macroalgae material, to obtain a purified mass of the macroalgae; and/or heating the purified mass at a temperature in a range of from 375 to 625° C. for a time period in a range of from 60 to 210 minutes, to obtain a char suitable for direct use as an adsorbent. The macroalgae in such methods may comprise at least 50 wt. % *Sargassum boveanum* macroalgae.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1 shows a chart of the removal efficiency, with error bars, after 4 adsorbent regeneration cycles for the removal of 2,4,6-trichlorophenol (TCP) on a *Sargassum Boveanum* macroalgae (BCM)-based char adsorbent.

DETAILED DESCRIPTION OF THE INVENTION

Figure 1:
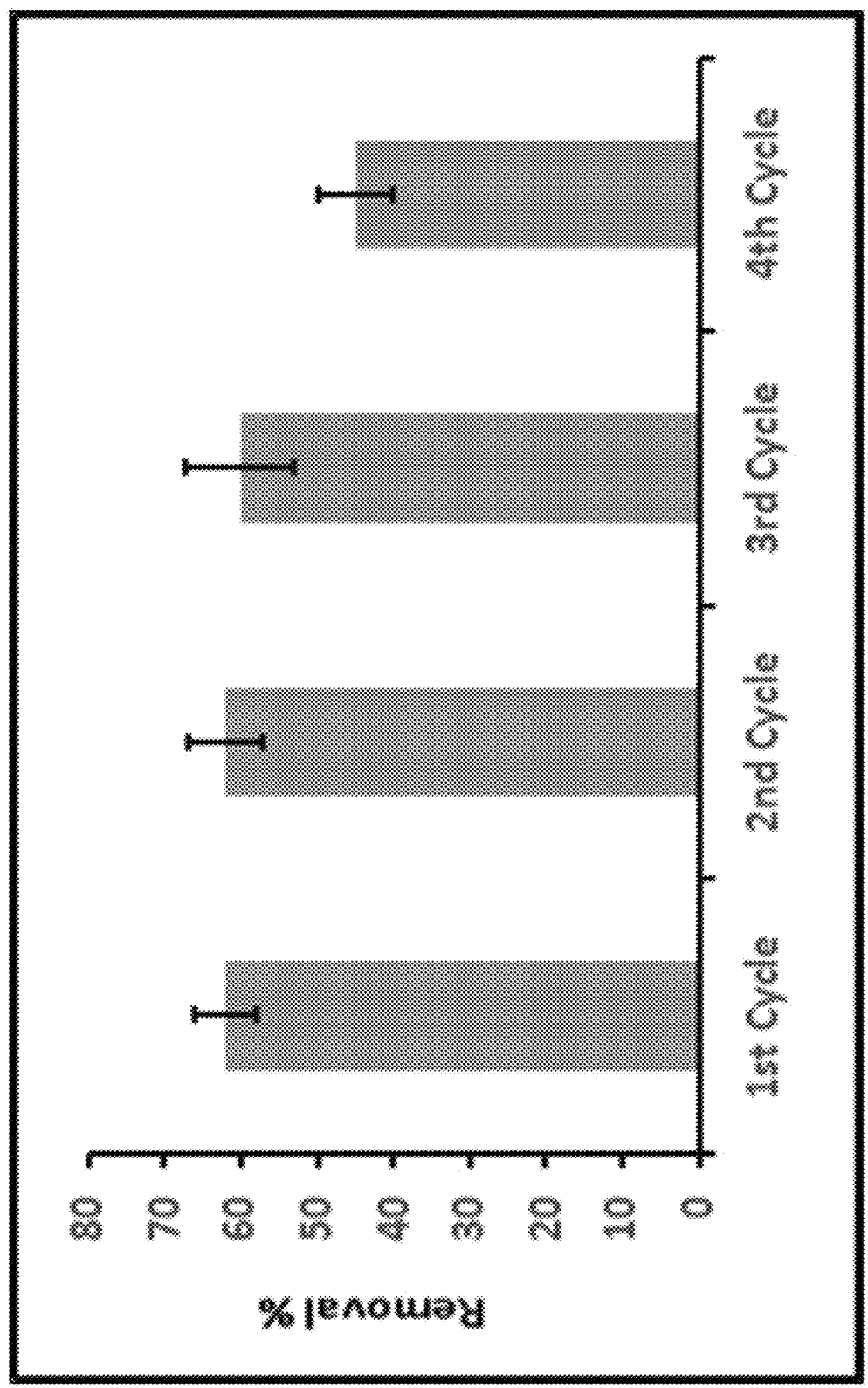

Aspects of the invention provide methods for removing a phenolic compound, i.e., one or more organic compounds having a core structure of at least one hydroxyl group on an aromatic—preferably benzene—ring (but not necessarily a majority of the molecular weight), from a fluid, i.e., a gas and/or liquid, which methods may comprise: contacting the fluid, comprising the phenolic compound, with an adsorbent comprising at least 90, 91, 92, 92.5, 93, 94, 95, 96, 97, 97.5, 98, 99, 99.1, 99.5, or 99.9 wt. %, based on total adsorbent weight, of a macroalgae char, wherein the char has a Brunauer-Emmett-Teller (BET) (or Barrett-Joyner-Halenda, BJH) surface area in a range of from 3 to 5 $m^2/g$, e.g., at least 3, 3.05, 3.1, 3.15, 3.2, 3.25, 3.3, 3.33, 3.35, 3.4, 3.45, 3.5, 3.55, 3.6, 3.625, 3.65, 3.675, 3.7, 3.725, 3.75, 3.775, 3.8, 3.825, 3.85, 3.875, 3.9, 3.925, 3.95, 3.975, or 4 $m^2/g$ and/or up to 5, 4.95, 4.9, 4.85, 4.8, 4.75, 4.7, 4.65, 4.6, 4.55, 4.5, 4.45, 4.4, 4.35, 4.3, 4.25, 4.2, 4.15, 4.1, 4.05, 4, 3.975, 3.95, 3.9375, 3.925, 3.9125, 3.9, 3.875, 3.8625, 3.85, 3.8375, 3.825, 3.8125, 3.8, 3.775, 3.75, 3.725, 3.7, 3.65, or 3.6 $m^2/g$.

The fluid treated by the char-comprising adsorbent may comprise a liquid and/or a gas, e.g., at least 50, 60, 70, 75, 80, 85, 90, 95, 96, 97, 97.5, 98, 99, 99.1, 99.5, or 99.9 wt. % of the total fluid weight may be liquid (or gas). The fluid may comprise at least 50, 60, 70, 75, 80, 85, 90, 95, 96, 97, 97.5, 98, 99, 99.1, 99.5, or 99.9 wt. %, relative to total fluid weight, of water. However, the fluid may contain other components such as pyridine, N,N-dimethylformamide (DMF), N,N-dimethylacetamide, N-methyl pyrrolidone (NMP), hexamethylphosphoramide (HMPA), dimethyl sulfoxide (DMSO), acetonitrile, tetrahydrofuran (THF), 1,4-dioxane, dichloromethane, chloroform, carbon tetrachloride, dichloroethane, acetone, ethyl acetate, pet ether, pentane, hexane(s), cyclohexane, decane(s), decalin, THF, dioxane, benzene, toluene, xylene(s), o-dichlorobenzene, diethyl ether, methyl t-butyl ether, diisopropyl ether, ethylene glycol, methanol, ethanol, isopropanol, propanol, n-butanol, CO, $N_2O$, $CO_2$, $H_2$, $N_2$, $CH_4$, $C_2H_6$, $C_2H_4$, $C_2H_2$, $C_3H_8$, $C_3H_6$, $C_3H_4$, $C_4H_{10}$, $C_4H_8$, $C_4H_6$, and/or air. The fluid may be a waste water and/or gas, e.g., the fluid may be a liquid effluent (or feed, as relevant) from a chemical synthesis plant, polymerization reactor, sewage processing facility, municipal water processing plant, pharmaceutical processing facility, dye plant, paper mill, sawmill, brewery, pressure-swing adapter, syn-gas cycle, methanol-to-olefin plant, methanol-to-gasoline plant, Fischer-Tropsch plant, waste incineration facility, silicon processing facility, agricultural (vegetable, fruit, livestock, meat, etc.) facility, slaughterhouse, farmland, fertilizer plant, OLED fabrication facility, refinery, etc. Inventive processes may be coupled with, for example, electro-Fenton processes, in series or otherwise.

The char may be prepared from *Sargassum boveanum* macroalgae, but the char may alternatively or additionally be made from any type of macroalgae/seaweed, including *Rhodophyta* (red), *Phaeophyta* (brown), and/or *Chlorophyta* (green) macroalgae, such as *Caulerpa*, *Fucus*, *Gracilaria*, *Laminaria*, *Macrocystis*, *Monostroma*, and/or *Porphyra* genuses. Relevant applications may call for the presence or exclusion of a variety of species, e.g., at least 0.5, 1, 2, 3, 4, 5, 7.5, 10, 15, 20, 25, 33, 40 wt. %, at least 50, 60, 70, 75, 80, 85, 90, or 95 wt. %, or no more than 40, 33, 25, 20, 15, 10, 9, 8, 7.5, 7, 6, 5, 4, 3, 2.5, 2, 1, or even 0.5 wt. % any of the macroalgae species described herein, alone or in combination.

Inventive chars may or may not include, depending upon availability and desired properties: *Caulerpa agardhii*, *Caulerpa alternans*, *Caulerpa annulata*, *Caulerpa antoensis*, *Caulerpa articulata*, *Caulerpa ashmeadii*, *Caulerpa bartoniae*, *Caulerpa bikinensis*, *Caulerpa biserrulata*, *Caulerpa brachypus*, *Caulerpa brownii*, *Caulerpa buginensis*, *Caulerpa cactoides*, *Caulerpa carruthersii*, *Caulerpa chemnitzia*, *Caulerpa cliftonii*, *Caulerpa constricta*, *Caulerpa corynephora*, *Caulerpa crassifolia*, *Caulerpa cupressoides*, *Caulerpa cylindracea*, *Caulerpa delicatula*, *Caulerpa dichotoma*, *Caulerpa diligulata*, *Caulerpa distichophylla*, *Caulerpa ellistoniae*, *Caulerpa elongata*, *Caulerpa falcifolia*, *Caulerpa faridii*, *Caulerpa fastigiata*, *Caulerpa fergusonii*, *Caulerpa filicoides*, *Caulerpa filiformis*, *Caulerpa flexilis*, *Caulerpa floridana*, *Caulerpa harveyi*, *Caulerpa hedleyi*, *Caulerpa heterophylla*, *Caulerpa holmesiana*, *Caulerpa imbricata*, *Caulerpa jumperoides*, *Caulerpa kempfii*, *Caulerpa lagara*, *Caulerpa lamourouxii*, *Caulerpa lanuginosa*, *Caulerpa lentillifera*, *Caulerpa lessonii*, *Caulerpa longifolia*, *Caulerpa macrodisca*, *Caulerpa macrophysa*, *Caulerpa manorensis*, *Caulerpa matsueana*, *Caulerpa mexicana*, *Caulerpa microphysa*, *Caulerpa murrayi*, *Caulerpa nummularia*, *Caulerpa obscura*, *Caulerpa okamurae*, *Caulerpa oligophylla*, *Caulerpa ollivieri*, *Caulerpa opposita*, *Caulerpa papillosa*, *Caulerpa parvifolia*, *Caulerpa parvula*, *Caulerpa paspaloides*, *Caulerpa peltata*, *Caulerpa pickeringii*, *Caulerpa pinnata*, *Caulerpa plumulifera*, *Caulerpa prolifera*, *Caulerpa pusilla*, *Caulerpa qureshii*, *Caulerpa racemosa*, *Caulerpa remotifolia*, *Caulerpa reniformis*, *Caulerpa reyesii*, *Caulerpa scalpelliformis*, *Caulerpa sedoides*, *Caulerpa selago*, *Caulerpa serrulata*, *Caulerpa sertularioides*, *Caulerpa seuratii*, *Caulerpa simpliciuscula*, *Caulerpa spathulata*, *Caulerpa subserrata*, *Caulerpa taxifolia*, *Caulerpa trifaria*, *Caulerpa urvilleana*, *Caulerpa vanbossea*, *Caulerpa veravalensis*, *Caulerpa verticillata*, *Caulerpa vesiculifera*, *Caulerpa webbiana*, and/or *Caulerpa zeyheri*.

Inventive chars may or may not include, depending upon availability and desired properties: *Fucus acicularis*, *Fucus angulatus*, *Fucus articulatus*, *Fucus atomarius*, *Fucus bastera*, *Fucus bipinnatus*, *Fucus callopilophorus*, *Fucus ceranoides*, *Fucus chalonii*, *Fucus cottonii*, *Fucus deformis*, *Fucus diaphanus*, *Fucus diffusus*, *Fucus distichus*, *Fucus edentatus*, *Fucus evanescens*, *Fucus fibrilla*, *Fucus fimbriatus*, *Fucus flaccidus*, *Fucus flagellaris*, *Fucus flexilis*, *Fucus fulvescens*, *Fucus furcatus*, *Fucus geniculatus*, *Fucus gramineus*, *Fucus guiryi*, *Fucus heterophyllus*, *Fucus hirtus*, *Fucus humboldtii*, *Fucus intermedius*, *Fucus lagasca*, *Fucus lichenoides*, *Fucus ligulatus*, *Fucus mamillaris*, *Fucus membranaceus*, *Fucus membranifolius*, *Fucus nereideus*, *Fucus osmunda*, *Fucus ovifrons*, *Fucus palmetta*, *Fucus papillosus*, *Fucus parksii*, *Fucus plumula*, *Fucus polyphyllus*, *Fucus potamogetifolius*, *Fucus racemosus*, *Fucus radicans*, *Fucus rigidus*, *Fucus serratus*, *Fucus seta*, *Fucus setaceus*, *Fucus siliculosus*, *Fucus spataeformis*, *Fucus spermophorus*, *Fucus sphaerocephalus*, *Fucus spiralis*, *Fucus squamulosus*,

*Fucus tendo, Fucus ulvoides, Fucus undulatus, Fucus uniformis, Fucus vesiculosus, Fucus virsoides,* and/or *Fucus zeylanicus.*

Inventive chars may or may not include, depending upon availability and desired properties: *Gracilaria abbottiana, Gracilaria abyssalis, Gracilaria aculeata, Gracilaria aggregata, Gracilaria ambigua, Gracilaria apiculata, Gracilaria apiculifera, Gracilaria arcuata, Gracilaria armata, Gracilaria articulata, Gracilaria ascidiicola, Gracilaria babae, Gracilaria baiana, Gracilaria beckeri, Gracilaria birdiae, Gracilaria blodgettii, Gracilaria brasiliensis, Gracilaria brevis, Gracilaria bursa-pastoris, Gracilaria camerunensis, Gracilaria canaliculata, Gracilaria capensis, Gracilaria caudata, Gracilaria cearensis, Gracilaria cerrosiana, Gracilaria cervicornis, Gracilaria changii, Gracilaria chilensis, Gracilaria chondracantha, Gracilaria chondroides, Gracilaria chouae, Gracilaria cliftonii, Gracilaria comosa, Gracilaria conferta, Gracilaria confervoides, Gracilaria coppejansii, Gracilaria corallicola, Gracilaria cornea, Gracilaria corniculata, Gracilaria coronopifolia, Gracilaria corticata, Gracilaria crispata, Gracilaria crockeri, Gracilaria crouaniorum, Gracilaria cuneata, Gracilaria cuneifolia, Gracilaria curtissiae, Gracilaria cylindrica, Gracilaria damaecornis, Gracilaria dawsonii, Gracilaria debilis, Gracilaria dendroides, Gracilaria dentata, Gracilaria denticulata, Gracilaria disputabilis, Gracilaria disticha, Gracilaria divaricata, Gracilaria divergens, Gracilaria domingensis, Gracilaria dotyi, Gracilaria dumosa, Gracilaria dura, Gracilaria ecuadoreana, Gracilaria edulis, Gracilaria ephemera, Gracilaria epihippisora, Gracilaria eucheumatoides, Gracilaria falconii, Gracilaria fanii, Gracilaria firma, Gracilaria fisheri, Gracilaria flabelliformis, Gracilaria flagelliformis, Gracilaria flexuosa, Gracilaria foliifera, Gracilaria fruticosa, Gracilaria galetensis, Gracilaria gigartinoides, Gracilaria gigas, Gracilaria glomerata, Gracilaria gracilis, Gracilaria hainanensis, Gracilaria halogenea, Gracilaria hancockii, Gracilaria hauckii, Gracilaria hayi, Gracilaria hermonii, Gracilaria heteroclada, Gracilaria hikkaduwensis, Gracilaria howensis, Gracilaria huangii, Gracilaria hummii, Gracilaria incrustata, Gracilaria incurvata, Gracilaria indica, Gracilaria intermedia, Gracilaria isabellana, Gracilaria kanyakumariensis, Gracilaria kilakkaraiensis, Gracilaria lacerata, Gracilaria lantaensis, Gracilaria latifrons, Gracilaria longa, Gracilaria longirostris, Gracilariopsis longissima, Gracilaria mammillaris, Gracilaria manilaensis, Gracilaria mannarensis, Gracilaria maramae, Gracilaria marcialana, Gracilaria mayae, Gracilaria megaspora, Gracilaria mexicana, Gracilaria microdendron, Gracilaria millardetii, Gracilaria minor, Gracilaria minuta, Gracilaria mixta, Gracilaria multifurcata, Gracilaria multipartita, Gracilaria occidentalis, Gracilaria oliveirarum, Gracilaria ornata, Gracilaria pachydermatica, Gracilaria pacifica, Gracilaria palmettoides, Gracilaria papenfussii, Gracilaria parvispora, Gracilaria patens, Gracilaria pauciramosa, Gracilaria percurrens, Gracilaria perplexa, Gracilaria peruana, Gracilaria pinnata, Gracilaria preissiana, Gracilaria prolifica, Gracilaria protea, Gracilaria pudumadamensis, Gracilaria pulvinata, Gracilaria punctata, Gracilaria pygmaea, Gracilaria ramisecunda, Gracilaria ramulosa, Gracilaria rangiferina, Gracilaria reptans, Gracilaria rhodocaudata, Gracilaria rhodymenioides, Gracilaria robusta, Gracilaria rubra, Gracilaria rubrimembra, Gracilaria sahcornia, Gracilaria salzmannii, Gracilaria secunda, Gracilaria secundata, Gracilaria shimodensis, Gracilaria silviae, Gracilaria skottsbergii, Gracilaria spinigera, Gracilaria spinuligera, Gracilaria spinulosa, Gracilaria srilankia, Gracilaria stellata, Gracilaria stipitata, Gracilaria sublittoralis, Gracilaria subsecundata, Gracilaria subtilis, Gracilaria sullivanii, Gracilaria symmetrica, Gracilaria taiwanensis, Gracilaria tenuistipitata, Gracilaria tepocensis, Gracilaria textorii, Gracilaria tilcvahiae, Gracilaria truncata, Gracilaria tsudae, Gracilaria tuberculosa, Gracilaria turgida, Gracilaria tuticorinensis, Gracilaria urvillei, Gracilaria usneoides, Gracilaria vanbosseae, Gracilaria veleroae, Gracilaria venezuelensis, Gracilaria vermiculata, Gracilaria vermiculophylla, Gracilaria verrucosa, Gracilaria vieillardii, Gracilaria vieirae, Gracilaria viridis, Gracilaria xiae-abbotii, Gracilaria yamamotoi,* and/or *Gracilaria yinggehaiensis.*

Inventive chars may or may not include, depending upon availability and desired properties: *Laminaria abyssalis, Laminaria agardhii, Laminaria appressirhiza, Laminaria brasiliensis, Laminaria brongardiana, Laminaria bulbosa, Laminaria bullata, Laminaria complanata, Laminaria digitata, Laminaria ephemera, Laminaria farlowii, Laminaria groenlandica, Laminaria hyperborea, Laminaria inclinatorhiza, Laminaria longipes, Laminaria multiplicata, Laminaria nigripes, Laminaria ochroleuca, Laminaria pallida, Laminaria platymeris, Laminaria rodrigueziii, Laminaria ruprechtii, Laminaria sachalinensis, Laminaria setchellii, Laminaria sinclairii, Laminaria solidungula,* and/or *Laminaria yezoensis.*

Inventive chars may or may not include, depending upon availability and desired properties: *Macrocystis angustifolia, Macrocystis communis, Macrocystis humboldtii, Macrocystis integrifolia, Macrocystis laevis, Macrocystis latifolia, Macrocystis luxurians, Macrocystis menziesii, Macrocystis obtusa, Macrocystis orbigniana, Macrocystis pelagica, Macrocystis planicaulis, Macrocystis pomifera, Macrocystis pyrifera,* and/or *Macrocystis tenuifolia.*

Inventive chars may or may not include, depending upon availability and desired properties: *Monostroma alittorale, Monostroma amorphum, Monostroma angicava, Monostroma antarcticum, Monostroma applanatum, Monostroma arcticum, Monostroma areolatum, Monostroma balticum, Monostroma blyttii, Monostroma bullosum, Monostroma crassidermum, Monostroma crassissimum, Monostroma crassiusculum, Monostroma crepidinium, Monostroma dactyliferum, Monostroma ecuadoreanum, Monostroma endiviifolium, Monostroma expansum, Monostroma fisheri, Monostroma fractum, Monostroma fuscum, Monostroma grevillei, Monostroma groenlandicum, Monostroma hariotii, Monostroma helgolandicum, Monostroma kuroshiense, Monostroma laceratum, Monostroma lactuca, Monostroma latissimum, Monostroma leptodermum, Monostroma lindaueri, Monostroma lubricum, Monostroma membranaceum, Monostroma moorei, Monostroma mundum, Monostroma nitidum, Monostroma obscurum, Monostroma ochotensis, Monostroma orbiculatum, Monostroma oxycoccum, Monostroma oxyspermum, Monostroma pacificum, Monostroma parvulum, Monostroma parvum, Monostroma pulchrum, Monostroma quaternarium, Monostroma saccodeum, Monostroma sandei, Monostroma splendens, Monostroma tubiforme, Monostroma tubulosum, Monostroma undulatum, Monostroma vahlii, Monostroma wittrockii,* and/or *Monostroma zostericola.*

Inventive chars may or may not include, depending upon availability and desired properties: *Porphyra akasakae, Porphyra angusta, Porphyra argentinensis, Porphyra atropurpurea, Porphyra augustinae, Porphyra autumnalis, Porphyra bangiaeformis, Porphyra bulbopes, Porphyra* capensis, *Porphyra carnea, Porphyra ceylanica, Porphyra chauhanii, Porphyra corallicola, Porphyra cordata, Porphyra cucullata, Porphyra delicatula, Porphyra dentimarginata, Porphyra dioica, Porphyra drewiae, Porphyra fujianensis, Porphyra grateloupicola, Porphyra grayana, Porphyra guangdongensis, Porphyra haitanensis, Porphyra hospitans, Porphyra inaequicrassa, Porphyra indica, Porphyraionae, Porphyra irregularis, Porphyra kanyakumariensis, Porphyra laciniata, Porphyra ledermannii, Porphyra linearis, Porphyra lucasii, Porphyra maculosa, Porphyra malvanensis, Porphyra marcosii, Porphyra marginata, Porphyra martensiana, Porphyra microphylla, Porphyra microphylla, Porphyra minima, Porphyra minor, Porphyra monosporangia, Porphyra mumfordii, Porphyra njordii, Porphyra nobilis, Porphyra nobilis, Porphyra ochotensis, Porphyra okamurae, Porphyra okhaensis, Porphyra oligospermatangia, Porphyra plocamiestris, Porphyra pujalsiae, Porphyra pulchra, Porphyra punctata, Porphyra purpurea, Porphyra qingdaoensis, Porphyra ramosissima, Porphyra reniformis, Porphyra rizzinii, Porphyra roseana, Porphyra schistothallus, Porphyra segregata, Porphyra tenuis, Porphyra tenuissima, Porphyra tenuissima, Porphyra tristanensis, Porphyra umbilicalis, Porphyra umbilicata, Porphyra violacea, Porphyra vulgaris, Porphyra woolhouseae,* and/or *Porphyra yamadae.*

The char may be produced by a process comprising heating *Sargassum boveanum* macroalgae, e.g., a mass of comprising at least 75, 80, 85, 90, 91, 92, 92.5, 93, 94, 95, 96, 97, 97.5, 98, 99, 99.1, 99.5, or 99.9 wt. % of the total weight of the *Sargassum boveanum* macroalgae (supplemented or supplanted by any of the above species), at a temperature in a range of from 375 to 600° C., e.g., 375, 385, 400, 412.5, 425, 437.5, 450, 462.5, 475, 487.5, 490, 492.5, 495, 497.5, 500, 502.5, 505, 507.5, 510, 512.5, 515, 517.5, 520, or 525° C. and/or up to 600, 595, 590, 585, 580, 575, 570, 565, 560, 555, 550, 545, 540, 535, 530, 525, 520, 517.5, 515, 512.5, 510, 507.5, 505, 502.5, 500, 497.5, 495, 492.5, 490, 487.5, or 485° C., under an inert atmosphere, e.g., He, $N_2$, $CO_2$, and/or Ar. Prior to the heating, the macroalgae may be dried at a temperature of, e.g., 75, 80, 82.5, 85, 87.5, 90, 92.5, 95, 97.5, 100, 101, 102.5, 105, 107.5, 110, 112.5, 115, 120, or 125° C. and/or up to 150, 145, 140, 135, 130, 125, 120, 117.5, 115, 112.5, 110, 107.5, 105, 102.5, 101, and/or 100° C. The drying may be conducted until weight stability is achieved, or for e.g., at least 0.5, 1, 1.5, 2, 2.5, 3, 4, 5, 6, 8, 10, 12, 14, 16, 18, or 24 hours and/or up to 7, 6, 5, 4, 3, 2, 1.5, 1, 0.75, 0.5, or 0.25 hours. The drying may be conducted at ambient pressure or, e.g., no more than 5, 4, 3, 2.5, 2, 1, 0.75, 0.5, 0.25, 0.2, 0.15, 0.125, 0.11, 0.1, 0.01, 0.001, 0.0001, or 0.00001 MPa. The drying may be conducted under vacuum, e.g., no more than 500, 100, 75, 50, 10, 5, 1, 0.1, 0.05, 0.01, 0.005, or 0.001 mbar and/or at least 0.01, 0.1, 1, 5, 10, 50, 100 μbar. After the drying, the dried macroalgae may be milled, pulverized, shredded, and/or crushed, such that the average particle size (largest dimension) is, for example, no more than 50, 35, 25, 15, 10, 9, 8, 7.5, 7, 6, 5, 4, 3, 2.5, 2, 1, 0.75, 0.5, 0.25, or 0.1 mm.

The phenolic compound may comprise 1, 2, 3, 4, 5, 6, 7, 8, 9, 10, 15, 20, 25, or more phenolic components. The phenolic compound(s) may have 1, 2, 3, or 4 halogen functional groups. The phenolic compound(s) may have a general structure

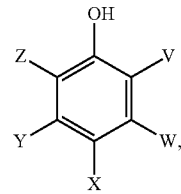

wherein at least one of V, W, X, Y, and Z is a halide, e.g., F, Cl, Br, or I (particularly Cl), and the remainder of V, W, X, Y, and Z are independently hydrogen azide, amine, nitrile, isonitrile, isocyanate, thiocyanate, isothiocyanate, nitro, nitroso, thiol, thioether, hydroxyl, methyl, ethyl, n-propyl, isopropyl, n-butyl, iso-butyl, sec-butyl, vinyl, $C_3$ alkenyl, $C_4$ alkenyl, $C_5$ alkenyl, $OCH_3$, $OCH_2CH_3$, $OCH_2CH_2CH_3$, $OCH(CH_3)_2$, $OCH_2CH_2CH_2CH_3$, isobutoxy, sec-butoxy, methoxymethyl, methoxyethyl, ethoxymethyl, (hetero)aryl ether (meaning heteroaryl or aryl), $C_1$-$C_5$ carboxylate, $C_0$-$C_5$ sulfonate, $C_1$-$C_{10}$ (reverse) amide (meaning amide C(O)N or reverse amide NC(O)), $C_1$-$C_{10}$ (reverse) ester, $C_1$-$C_{10}$ (reverse) carbamate, $C_0$-$C_{10}$ (reverse) sulfonamide, $C_0$-$C_{10}$ (reverse) sulfonic ester, $C_1$-$C_6$ ketal, $C_1$-$C_5$ ketone, or $C_1$-$C_5$ aldehyde, or 2, 3, or 4 of V, W, X, Y, and Z may be bonded together as a 5, 6, 7, 8, or 10-atom (C, N, S, O) rings, having any aforementioned substitution. The phenolic compound may comprise a chlorophenol, i.e., any phenolic compound comprising at least one chloride functional group. The phenolic compound may comprise 2,4,6-trichlorophenol and/or 2,4-dimethylphenol.

Aspects of the invention provide adsorbents comprising a macroalgae char in an amount of at least 97.5, 98, 99, 99.1, 99.5, 99.9, 99.95, 99.99, 99.995, 99.999, or 99.9999 wt. %, relative to total adsorbent weight, wherein the char has a BET or BJH surface area in a range of from 3 to 5.5 m$^2$/g, e.g., at least 3, 3.125, 3.25, 3.375, 3.5, 3.625, 3.67, 3.75, 3.8, 3.8, 3.833, 3.867, or 3.9 m$^2$/g and/or up to 5.5, 5.25, 5, 4.875, 4.75, 4.67, 4.625, 4.5, 4.375, 4.33, 4.25, 4.125, 4, 3.967, 3.95, 3.9333, 3.925, 3.9125, 3.9, 3.867, 3.85, 3.833, 3.825, 3.8125, 3.8, 3.775, 3.75, 3.725, 3.7 m$^2$/g (or any range or endpoint described above), a pore volume in a range of from 0.0025 to 0.01 mL/g, e.g., at least 0.0025, 0.00275, 0.003, 0.003125, 0.00325, 0.003375, 0.0035, 0.003625, 0.00375, 0.003875, 0.004, 0.004125, 0.00425, 0.004375, 0.0045, 0.004625, 0.00475, 0.004875, 0.005, 0.005125, 0.00525, 0.005375, 0.0055, 0.005625, 0.00575, 0.005875, 0.006, 0.006125, 0.00625, 0.006375, or 0.0065 mL/g and/or 0.01, 0.00975, 0.0095, 0.00925, 0.009, 0.00875, 0.0085, 0.008375, 0.00825, 0.008125, 0.008, 0.007875, 0.00775, 0.007625, 0.0075, 0.007375, 0.00725, 0.007125, 0.007, 0.006875, 0.00675, 0.006625, 0.0065, 0.006375, 0.00625, 0.006125, 0.006, 0.005875, 0.00575, 0.005625, or 0.0055 up to mL/g, and/or an average pore size in a range of from 5 to 15 Å, e.g., at least 5, 5.25, 5.5, 5.75, 6, 6.25, 6.5, 6.625, 6.75, 6.875, 7, 7.125, 7.25, 7.375, 7.5, 7.75, or 8 Å and/or up to 15, 14.5, 14, 13.5, 13, 12.5, 12, 11.5, 11, 10.5, 10, 9.75, 9.5, 9.25, 9, 8.75, 8.5, 8.25, 8, 7.875, 7.75, 7.625, 7.5, 7.375, 7.25, 7.2, 7.15, 7.125, 7.1, 7.05, 7, 6.95, 6.9, 6.85, 6.8, or 6.75 Å.

The adsorbent may be suitable for reuse at least 3, 4, 5, 6, 7, 8, 9, or more times maintaining at least 95, 96, 97, 97.5, 98, 99, 99.1, 99.5, or 99.9% of its original adsorption efficiency for 1, 2, 3, 4, 5, 6, 7, 8, 9, 10, or more phenolic, esp. chlorophenolic, compounds as described herein. The adsorbent may be suitable for reuse at least 4, 5, 6, 7, 8, 9, 10, or more times maintaining at least 70, 75, 80, 85, 90, 91, 92, 92.5, 93, 94, 95, 96, 97, 97.5, 98, 99, 99.1, 99.5, or 99.9% of its original adsorption efficiency for 1, 2, 3, 4, 5, 6, 7, 8, 9, 10, or more phenolic, esp. chlorophenolic, compounds as described herein.

Aspects of the invention provide adsorbents consisting essentially of, i.e., having no less than 5% reduction of the initial cycle adsorption efficacy and/or recycling adsorption count/performance, a macroalgae char having: a BET surface area in a range of from 2 to 7.5 m$^2$/g, e.g., at least 2, 2.25, 2.5, 2.75, 3, 3.25, 3.5, 3.75, or 4 m$^2$/g and/or up to 7.5, 7.25, 7, 6.75, 6.5, 6.25, 6, 5.75, 5.5, 5.25, 5, 4.75, 4.5, 4.25, 4.2, 4.1, 4, 3.9, or 3.8 m$^2$/g (or any range or endpoint described above); a pore volume in a range of from 0.002 to 0.02 mL/g, e.g., at least 0.002, 0.0025, 0.003, 0.0035, 0.004, 0.0045, 0.005, 0.0055, 0.006, 0.0065 mL/g and/or up to 0.02, 0.019, 0.018, 0.017, 0.016, 0.015, 0.014, 0.013, 0.012, 0.011, 0.01, 0.009, 0.008, 0.0075, 0.007, 0.0065, 0.006 mL/g (or any range or endpoint described above); and/or an average pore size in a range of from 2.5 to 25 Å, e.g., at least 2.5, 2.75, 3, 3.25, 3.5, 3.75, 4, 4.25, 4.5, 4.75, 5, 5.25, 5.5, 5.75, 6, 6.1, 6.2, 6.3, 6.4, 6.5, 6.6, 6.7, 6.8, 6.9, or 7 Å and/or up to 25, 22.5, 20, 17.5, 15, 12.5, 12, 11.5, 11, 10.5, 10, 9.5, 9, 8.75, 8.5, 8.25, 8, 7.75, 7.5, 7.375, 7.33, 7.25, 7.2, 7.15, 7.125, 7.1, or 7.05 Å (or any range or endpoint described above).

Aspects of the invention provide waste water treatment systems, for example, a piping, pool, batch reactor, other apparatus/system configured for contacting inventive char/adsorbent any of the waste streams described above, including gaseous exhausts, comprising any permutation of the inventive adsorbents described herein, wherein adsorbent is suitable to adsorbing at least 50, 55, 60, 62.5, 65, 67.5, 70, 72.5, 75, 77.5, 80 wt. % or more of 1, 2, 3, 4, 5, 6, 7, 8, 9, 10, or more phenolic, esp. chlorophenolic, compounds as described herein present in the waste water at a concentration up to 250, 300, 350, 400, 450, 500, 550, 600, 650, 700, 750, 800, 850, 900, 950, 1000, 1250, 1500, 1750, 2000, 2500, 3000, 3500, or 5000 ppm per gram of adsorbent. Aspects of the invention provide chlorophenolic compound removal systems, such as housings containing inventive char, columns packed with char, "tea bag" style suspensions of inventive char in fluid, etc., comprising any permutation of the inventive adsorbents described herein. The waste water may be, for example, seawater, 10, 15, 20, 25, 33, 40, 50, 60, 70, 75, 80, 85, 90, 95% or more brackish, or fresh water.

Aspects of the invention provide methods of making any permutation of the inventive adsorbents described herein, which methods may comprise: freeing a mass of macroalgae of at least 75, 80, 85, 90, 91, 92, 92.5, 93, 94, 95, 96, 97, 97.5, 98, 99, 99.1, 99.5, 99.9, 99.95, 99.99, or 99.999 wt. % of non-macroalgae material (excluding water and materials integral to the macroalgae), such as mud, foreign inorganic material, foreign organic material including minerals, metal ions, metals, etc., and foreign organic materials including water-soluble alginates, synthetic chemicals, etc., to obtain a purified mass of the macroalgae; and/or heating the purified mass at a temperature in a range of from 375 to 625° C., e.g., at least 375, 400, 410, 420, 430, 440, 450, 460, 470, 480, 490, 500, 510, or 515° C. and/or 625, 615, 600, 590, 580, 570, 560, 550, 540, 530, 525, 520, 515, 510, 505, 500, 495, 490, or 485° C. (or any range or endpoint described above) for a time period in a range of from 60 to 210 (or more) minutes, e.g., at least 60, 75, 90, 105, 120, 135, or 150 minutes and/or up to 210, 195, 180, 165, 150, 135, 120, or 105 minutes, to obtain a char suitable for direct use, i.e., without subsequent chemical treatment, such as cross-linking, foreign metal ions impregnation (e.g., Pt, Pd, Cu, Ti, Zr, Fe, Rh, Ru, Ag, and/or Au ions), and/or surface modifications (e.g., acidifying, alkalifying, alkylating, formylating, carbonylating, nitrating, and/or aminating, etc.), as an adsorbent. The macroalgae in such methods may comprise at least 50, 60, 70, 75, 80, 85, 90, 90, 91, 92, 92.5, 93, 94, 95, 96, 97, 97.5, 98, 99, 99.1, 99.5, or 99.9 wt. % *Sargassum boveanum* macroalgae, and/or any of the other macroalgae described herein. The "freeing" may occur by washing with a solvent, such as any described herein, particularly water, by shaking, centrifuging, filtering, and/or related known techniques. The washing may be followed by a drying and comminuting process, as described above, to provide a dry particulate mass of macroalgae as the purified mass. The purified mass is typically untreated by cross-linkers, foreign metal ions, and/or surface modifiers.

Aspects of the invention involve biochars from *Sargassum Boveanum* macroalgae, their preparation and their use as an adsorbent for the removal of phenolic compounds, e.g., from aqueous solutions. Aspects of the invention provide the adsorption of phenolic compounds and optionally further reusability, e.g., for 4, 5, 6, 7, 8, 9, 10, or more cycles, of the adsorbent with at least 60, 70, 75, 80, 85, 90, 92.5, 95, 97.5, 98, 99, 99.1, 99.5, or 99.9% of the original adsorption/removal efficacy, e.g., in fresh water, brackish, and/or in seawater.

The process for preparing inventive char-based adsorbents does not require, e.g., treatment with $HNO_3$ and/or nitration/amination, without a (strong) base treatment, e.g., with hydroxide, carbonate, or the like, such as KOH, NaOH, LiOH, $K_2CO_3$, $Na_2CO_3$, and/or $Li_2CO_3$, without hydroformylation, and/or without formaldehyde cross-linking. The synthesis of inventive chars and/or adsorbents does not require a pressure above ambient pressure, and may be conducted, e.g., at a pressure of no more than or less than 3.5, 3.4, 3.33, 3.3, 3.25, 3.2, 3.15, 3.1, 3, 2.75, 2.5, 2.25, 2, 1.75, 1.5, 1.25, 1, 0.75, 0.5, 0.25, 0.2, 0.15, 0.11, or 0.1 MPa. Inventive adsorbents may exclude cross-linking, surface modification (e.g., by methyl capping, aldehyde-based cross-linking, and/or aldehyde-based bridging, or may comprise no more than 40, 33, 25, 20, 15, 10, 7.5, 5, 4, 3, 2.5, 2, 1, 0.5, 0.1, 0.01, 0.001, 0.0001, or 0.00001 atom. %, relative to the total adsorbent surface atomic content, of cross-linked, capped, and/or bridged atoms.

Inventive chars may exclude or comprise no more than 15, 10, 7.5, 5, 4, 3, 2.5, 2, 1, 0.5, 0.1, 0.01, 0.001, 0.0001, or 0.00001 wt. %, relative to the total adsorbent weight, of copper, copper ions, and/or copper compounds, individually or in combination.

EXAMPLES

MATERIALS: 2,4,6-trichlorophenol (TCP) and 2,4-dimethylphenol (DMP) were selected as model adsorbates, i.e., phenolic targets for removal by adsorption. The compounds, i.e., 2,4,6-trichlorophenol and 2,4-dimethylphenol, used herein were analytical reagent grade and purchased from Chem Service, Inc, USA. Dichloromethane of 99.9% purity was purchased from Fisher Scientific, Germany. Deionized water used for the entire experiment.

PREPARATION AND CHARACTERIZATION OF ADSORBENT: The *Sargassum Boveanum* macroalgae were collected from the coastal water of the Arabian Gulf and washed thoroughly with tap water then by distilled water to remove water-soluble impurities. The washed material was dried at 110° C. for 24 hrs. The dried ground macroalgae was carbonized in a tube furnace at 500° C. under inert atmosphere for two (2) hours to obtain biochar-derived macroalgae (BCM). The biochar-derived macroalgae (BCM) was cooled under an inert atmosphere and preserved in a closed vial for characterization and use in the adsorption experiments.

The functional groups on the surface of the macroalgae and biochar-derived macroalgae (BCM) adsorbents were analyzed using a Nicolet 6700 Thermo Electron Fourier-transform infrared (FTIR) instrument. It has been found that the surface of the biochar-derived macroalgae (BCM) adsorbent prepared according to the Example contains proteins and polysaccharides with hydroxyl (OH) functional groups, amine ($NH_2$) functional groups, hemiacetals, and carbonyl functional groups that also confirm the presence of polyalginate compounds in the structure.

To study the stability of the prepared adsorbent, a thermal gravimetric analysis (TGA) under air and nitrogen was conducted using the TGA Q500 thermal gravimetric analysis instrument. It was found that the exemplary biochar-derived macroalgae (BCM) adsorbent is stable under air atmosphere up to 400° C. and under nitrogen up to 600° C. without significant loss in its weight or changing in the structure. The exemplary inventive adsorbent's surface morphology was characterized using the scanning electron microscope (SEM) using a Jeol 6700LV instrument. The results show the surface of the adsorbent is heterogeneous with small openings and holes that has an active adsorption sites. The surface area of the exemplary inventive adsorbent is 3.8 $m^2/g$ (e.g., at least 3.25, 3.3, 3.33, 3.35, 3.4, 3.45, 3.5, 3.55, 3.6, 3.65, 3.67, 3.7, 3.75, 3.8,) and the pore volume is 0.006 mL/g with an average pore size 7.049 Å, as characterized using an AutosorbiQ Quantachrome automated gas sorption analyzer (USA).

Preparation of Adsorbate Solution

Stock solutions of 1000 ppm of 2,4,6-trichlorophenol (TCP) or 2,4-dimethylphenol (DMP) was prepared in deionized water. Subsequent test solutions were prepared by appropriate dilution of the respective stock solutions with deionized water for the adsorption experiments.

Analytical Method for TCP Extraction and Analysis

A simple, fast, precise, accurate, and rigid analytical method was developed for nine phenolic compounds involving extraction and quantification. The model compounds for more generalized phenolic compounds (as a class) were taken as 2,4,6-trichlorophenol (TCP) and 2,4-dimethylphenol (DMP). Briefly, the phenolic compounds are extracted from a 5 mL aliquot of the filtered aqueous sample, before and after the adsorption, using 5 mL dichloromethane solvent, then a 1 μL from the extract is analyzed using an Agilent Technology 6890N gas chromatography coupled with flame ionization detector (GC-FID).

Use and Regeneration of the Inventive Adsorbent

To model real applications of the adsorbent, the removal of phenolic compounds from seawater with a pH of 7.80 and a salinity of 41 g/kg was tested. A 50 mL sample of seawater was spiked with phenolic compounds and 200±0.1 mg biochar-derived macroalgae (BCM) adsorbent was used. The concentrations of phenolic compounds before and after the adsorption were measured. It was found that the biochar-derived macroalgae (BCM) adsorbent has the capability to remove around 60% of the phenolic compounds from the tested seawater.

Figure 2:
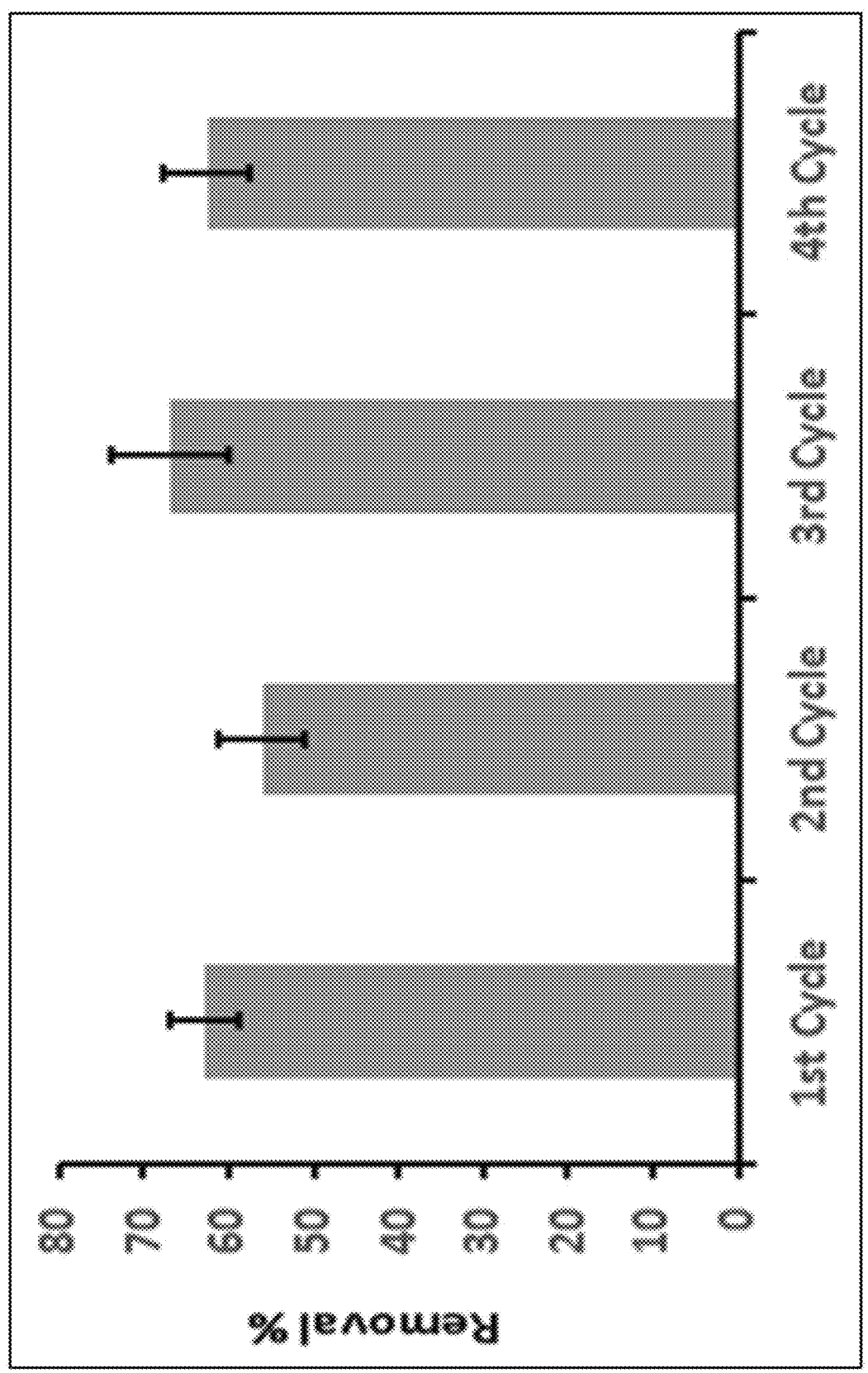
FIG. 2 shows a chart of the removal efficiency, with error bars, after 4 adsorbent regeneration cycles for the removal of 2,4-dimethyphenol (DMP) on a BCM-based char adsorbent.

The reusability of the exemplary biochar-derived macroalgae (BCM) adsorbent prepared according to the Example was also examined. The regeneration procedure of biochar-derived macroalgae (BCM) adsorbent followed was relatively cost-effective, environmentally friendly, and simple. Briefly, after the completion of the adsorption experiments, the exemplary biochar-derived macroalgae (BCM) adsorbent loaded with phenolic compounds was filtered, washed three times with distilled water to remove the stacked salts, then heated at 250° C. for one day to remove the adsorbed phenolic molecules. The regenerated BCM was reused for the next adsorption, and the successive adsorption-desorption cycles were repeated four times. As shown in FIG. 1, the exemplary inventive biochar-derived macroalgae (BCM) adsorbent remained, within the experimental error, nearly unchanged in their ability for 2,4,6-trichlorophenol (TCP) adsorption for at least three cycles. However, a 27% loss in the exemplary biochar-derived macroalgae (BCM) adsorbent efficiency was found after the fourth cycle. The loss in adsorption efficiency may be attributed to the adsorbent degradation and blocking the micro-pores, which may decrease the surface area and the total active adsorption sites. As shown in FIG. 2, in the case of 2,4-dimethylphenol (DMP), biochar-derived macroalgae (BCM) adsorbent remained, within the experimental error, nearly unchanged in their ability for DMP removal for at least four cycles. Efficiency losses for phenolic compounds may be in a range of, e.g., at least 0.5, 1, 2, 2.5, 3.33, or 5% and/or up to 30, 27.5, 25, 22.5, 20, 17.5, 15, 12.5, or 10%, for the $4^{th}$, $5^{th}$, $6^{th}$, $7^{th}$, $8^{th}$, $9^{th}$, $10^{th}$, or further cycle.

Adsorption Isotherms and Thermodynamics of TCP and DMP

The experimental data of 2,4,6-trichlorophenol (TCP) and 2,4-dimethylphenol (DMP) adsorption was fitted with Freundlich, Langmuir, and Temkin adsorption isotherms at 24±0.1° C. The experimental data fit Freundlich model with a squared correlation coefficient ($R^2$) higher than 0.98, whereby the deviation between the experimental and the calculated $q_e$ were the lowest with a summation of relative error less than 4.0. The Freundlich isotherm obtained parameters, n and $K_f$, from the linearized model for TCP adsorption are respectively 1.67 and 5.93 $((mg/g)(dm^3/mg)^{1/n})$. The separation factor, $R_L$, was calculated to be 0.04 mg/g and the maximum monolayer adsorption, $Q_o$, was calculated to be 74.47 mg/g as obtained from Langmuir isotherm models.

In case of 2,4-dimethylphenol (DMP) compound adsorption, the n was found to be 1.93 $((mg/g)(dm^3/mg)^{1/n})$ and $K_f$ was found to be 3.18 $((mg/g)(dm^3/mg)^{1/n})$. The separation factor, $R_L$, for 2,4-dimethylphenol (DMP) using the prepared adsorbent was found to be 0.02 and the maximum monolayer adsorption, $Q_o$, was found to be 9.37 mg/g. This indicates the adsorption of 2,4,6-trichlorophenol (TCP) and 2,4-dimethylphenol (DMP) on the exemplary biochar-derived macroalgae (BCM) adsorbent is favorable. The adsorption mechanism of 2,4,6-trichlorophenol (TCP) and 2,4-dimethylphenol (DMP) on the biochar-derived macroalgae (BCM) adsorbent is mixed and dominated by a physisorption mechanism, and the hydrogen bonding, Van der Waals interactions, as well as acceptor-donor interaction between the adsorbent surface and the phenolic molecules contributed to the adsorption process and these molecules form multi-layers on the adsorbents. The adsorption capacities of the exemplary biochar-derived macroalgae (BCM) adsorbent for the model phenolic compounds, 2,4,6-trichlorophenol (TCP) and 2,4-dimethylphenol (DMP), obtained in the testing conditions described herein are effective for use in practice.

To further investigate the adsorption mechanism, the thermodynamic parameters including the Gibbs free energy ($\Delta G$), the enthalpy ($\Delta H$), and entropy of adsorption ($\Delta S$) were calculated for both phenolic compounds, i.e., 2,4,6- trichlorophenol (TCP) and 2,4-dimethylphenol (DMP), and summarized below in Table 1.

TABLE 1

Thermodynamic parameters for the adsorption of 2,4,6-trichlorophenol (TCP) and 2,4-dimethylphenol (DMP) on biochar-derived macroalgae (BCM) adsorbent.

| Temperature (K) | TCP | | | DMP | | |
|---|---|---|---|---|---|---|
| | $\Delta G$ (kJ/mol) | $\Delta H$ (kJ/mol) | $\Delta S$ (kJ/K) | $\Delta G$ (kJ/mol) | $\Delta H$ (kJ/mol) | $\Delta S$ (kJ/mol) |
| 297 | −3.82 | 51.29 | 0.19 | −5.84 | 108.10 | 0.38 |
| 303 | −4.93 | | | −8.14 | | |
| 308 | −5.86 | | | −10.06 | | |
| 313 | −6.79 | | | −11.97 | | |
| 323 | −8.64 | | | −15.81 | | |
| 333 | −10.50 | | | −19.65 | | |

The negative values for the $\Delta G$ of the adsorption at each temperature measured indicate that the adsorption process of 2,4,6-trichlorophenol (TCP) and 2,4-dimethylphenol (DMP) on the exemplary biochar-derived macroalgae (BCM) adsorbent is spontaneous and thermodynamically favorable. However, the positive $\Delta H$ value and the decrease in $\Delta G$ with increasing the temperature indicate that the adsorption process of 2,4,6-trichlorophenol (TCP) and 2,4-dimethylphenol (DMP) is an endothermic process. The small positive values of $\Delta S$ reflect the affinity of the adsorbent toward the 2,4,6-trichlorophenol (TCP) and 2,4-dimethylphenol (DMP) molecules and indicate increasing of randomness at the liquid/solid interface.

Referring now to the drawings, wherein like reference numerals designate identical or corresponding parts throughout the several views.

FIG. 1 shows a chart of the cyclical performance of the exemplary inventive biochar-derived macroalgae (BCM) adsorbent on reuse with respect to 2,4,6-trichlorophenol (TCP). The chart indicates that the inventive biochar-derived macroalgae (BCM) adsorbent is substantially unchanged in its 2,4,6-trichlorophenol (TCP) adsorption for at least three cycles, with a roughly 27% loss in the efficiency after the fourth cycle.

FIG. 2 shows a chart of the cyclical performance of the exemplary inventive biochar-derived macroalgae (BCM) adsorbent on reuse with respect to 2,4-dimethylphenol (DMP). In the case of 2,4-dimethylphenol (DMP), the biochar-derived macroalgae (BCM) adsorbent remains nearly unchanged in their ability for DMP removal for at least four cycles.

Numerous modifications and variations of the present invention are possible in light of the above teachings. It is therefore to be understood that within the scope of the appended claims, the invention may be practiced otherwise than as specifically described herein.

The invention claimed is:

1. A method for removing a phenolic compound from a fluid, the method comprising:
    contacting the fluid, comprising the phenolic compound, with an adsorbent comprising at least 90 wt. %, based on total adsorbent weight, of a macroalgae char, thereby forming a loaded adsorbent,
    wherein the macroalgae char has a BET surface area in a range of from 3 to 5 $m^2/g$, a pore volume in a range of from 0.002 to 0.02 mL/g, and an average pore size in a range of from 2.5 to 25 Å.

2. The method of claim 1, wherein the fluid is a liquid.

3. The method of claim 1, wherein the fluid is a gas.

4. The method of claim 1, wherein the fluid comprises at least 50 wt. %, relative to total fluid weight, of water.

5. The method of claim 1, wherein the fluid is a waste water.

6. The method of claim 1, wherein the macroalgae char is *Sargassum boveanum* macroalgae char.

7. The method of claim 1, further comprising preparing the macroalgae char by heating *Sargassum boveanum* macroalgae at a temperature in a range of from 375 to 600° C. under an inert atmosphere.

8. The method of claim 7, wherein the preparing the macroalgae char is devoid of amination.

9. The method of claim 1, wherein the phenolic compound comprises 2,4,6-trichlorophenol.

10. The method of claim 1, wherein the phenolic compound comprises 2,4-dimethylphenol.

11. The method of claim 1, wherein the phenolic compound comprises a chlorophenol.

12. The method of claim 1, further comprising regenerating the adsorbent by:
    washing the loaded adsorbent with distilled water to form a washed adsorbent; and
    heating the washed adsorbent to 250° C.

13. The method of claim 1, wherein the phenolic compound is present in the fluid in an amount of 250 to 5000 ppm per gram of the adsorbent.

14. The method of claim 1, wherein the macroalgae char comprises surface functional groups which are at least two selected from the group consisting of a hydroxyl group, a hemiacetal, a carbonyl group, and an amine group.

15. The method of claim 14, wherein the surface functional groups are bonded to proteins and/or polysaccharide on the macroalgae char.

* * * * *